May 28, 1963   A. ROTH   3,091,349
VEHICLE PARKING INSTALLATION
Filed Oct. 10, 1961   5 Sheets-Sheet 1

INVENTOR.
ANTON ROTH
BY Kurt Kelman
AGENT

INVENTOR.
ANTON ROTH
BY
Kurt Kelman
AGENT

May 28, 1963 A. ROTH 3,091,349
VEHICLE PARKING INSTALLATION
Filed Oct. 10, 1961 5 Sheets-Sheet 3

INVENTOR.
ANTON ROTH
BY
Kurt Kelman
AGENT

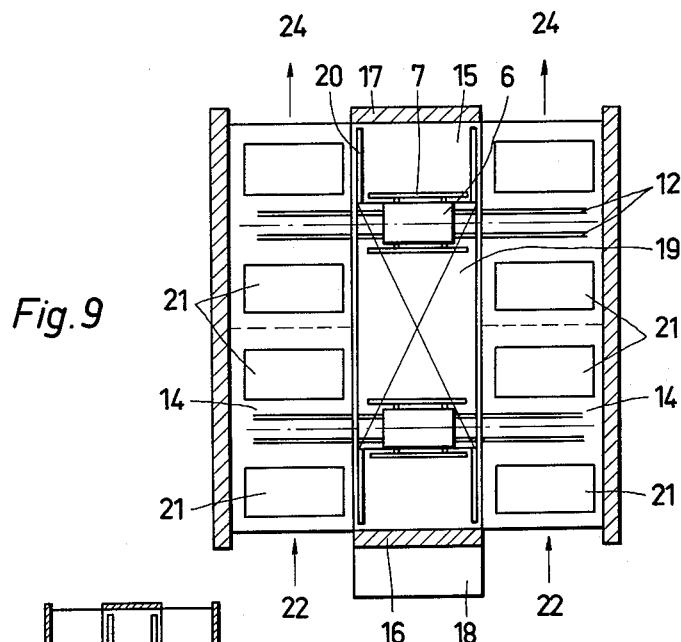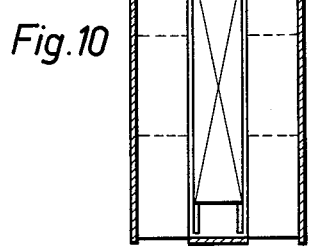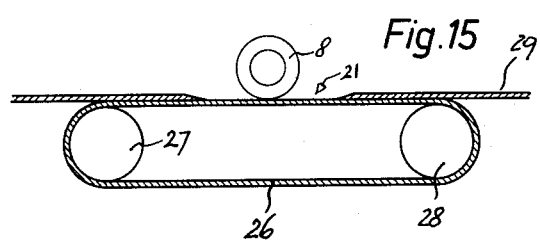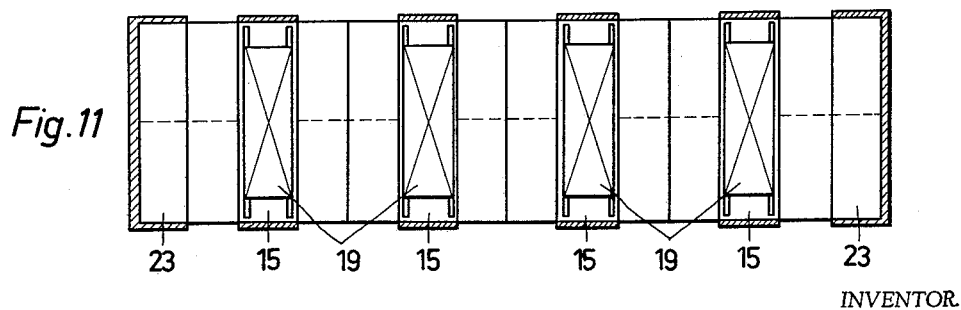

May 28, 1963 A. ROTH 3,091,349
VEHICLE PARKING INSTALLATION
Filed Oct. 10, 1961 5 Sheets-Sheet 5

INVENTOR.
ANTON ROTH
BY
Kurt Kelman
AGENT

United States Patent Office 3,091,349
Patented May 28, 1963

3,091,349
VEHICLE PARKING INSTALLATION
Anton Roth, Hochstadter Landstrasse,
Hanau (Main), Germany
Filed Oct. 10, 1961, Ser. No. 144,170
Claims priority, application Germany Oct. 11, 1960
5 Claims. (Cl. 214—16.1)

This invention relates to multi-story buildings and machinery employed for parking vehicles on several levels above or below ground level, and more specifically to parking installations in which the vehicles are moved to and from the various levels by lifts or elevators.

More particularly, the present invention is concerned with a parking installation in which the vehicles are moved by transfer carriages from the elevator platform towards their individual parking stalls in a horizontal direction perpendicular to the normal direction of vehicle movements and in which the individual parking stalls are arranged on such relation to the elevator shaft on the various levels that this relation in conjunction with the transfer carriage operation provides advantages of speed and convenience in vehicle processing.

One object of the present invention is to provide a parking installation wherein the vehicles are conveyed to their parking stalls at various levels by fast-operating, safe, and space-saving means operating in a direction perpendicular to the normal direction of motion of a vehicle.

It is another object of this invention to provide means for lifting the vehicle above the floor for such sidewise motion by an operation requiring no lifting of the means employed to convey the vehicle sidewise in a direction perpendicular to its normal motion.

Another object of this invention is the adaptation of the vehicle entry and exit to the elevator platform in such a way as to achieve a high vehicle processing capacity in the reception and issue of vehicles.

In conclusion, it is an object of the invention to utilize the means so provided to keep the cost required for a parking installation to a minimum.

Details of this invention, its advantages and its mode of operation will be described with reference to the drawings attached indicating some embodiments of the invention as specified hereinafter, in which drawings the reference numerals associated with the same parts of the embodiments are the same throughout, and where—

FIG. 9 is the ground floor plan of a modified embodiment of the invention permitting convenient vehicle entry and exit;

FIG. 10 is the floor plan of an entry and exit arrangement similar to that of FIG. 9, but provided with space for three vehicles on each side of the elevator;

FIG. 11 is the ground floor plan of a garage building combining a plurality of units as shown in FIG. 9 and two additional long-time parking stalls.

FIG. 15 shows a detail of the apparatus of FIG. 9 in elevational section.

Figure 1:
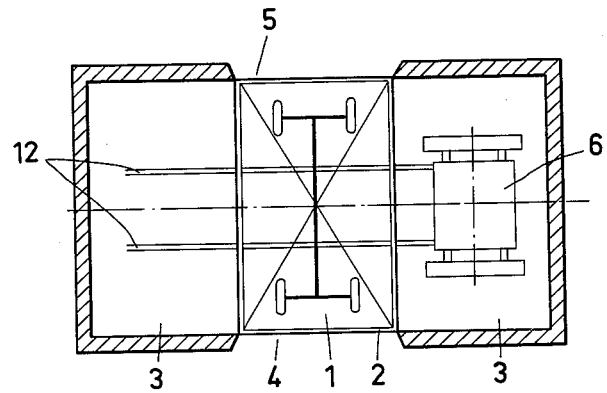
FIG. 1 is a sectional plan view of a vehicle entry and exit floor including two parking stalls, each capable of taking one vehicle, and arranged on both long sides of an elongated elevator platform.

In FIG. 1, the elevator platform 1 is vertically movable in the elevator shaft 2. Adjoining the elevator shaft are two one-vehicle parking stalls 3. In this embodiment, the vehicles move onto the elevator platform on the ground floor in a conventional manner under their own power. The elevator platform fills the elevator-shaft cross section.

At the floor level of the installation represented by FIG. 1, the vehicle approaches the elevator platform 1 through an entrance 4 and leaves through an exit 5. The transfer carriage or cross carriage 6 is shown in an idle position beside the platform 1.

Figure 2:
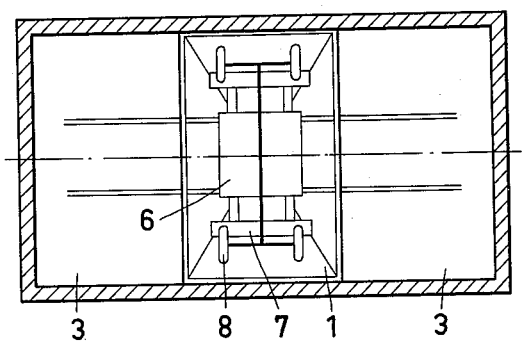
FIG. 2 is a similar view of a higher level or story located above the ground level of FIG. 1.

FIG. 2 shows the floor plan of any one of the upper or lower stories or levels of the installation partly described in connection with FIG. 1. The cross carriage 6 has been moved underneath the vehicle, the wheels 8 of which are gripped by the extended vehicle-supporting jaws 7. From this position, the carriage supporting the vehicle may be shifted sidewise to a free parking lot.

Figure 3:
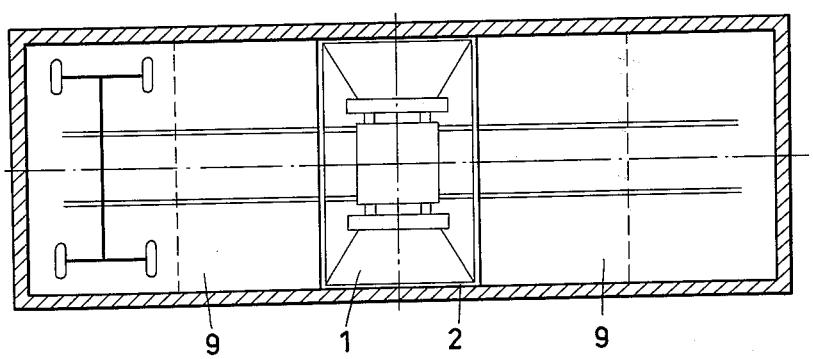
FIG. 3 is the floor plan of an installation in which twin parking stalls are provided on each side of the elevator shaft.

In FIG. 3 the parking stalls 9 have twice the floor space of those shown in FIGS. 1 and 2 and may take two vehicles each.

Figure 4:
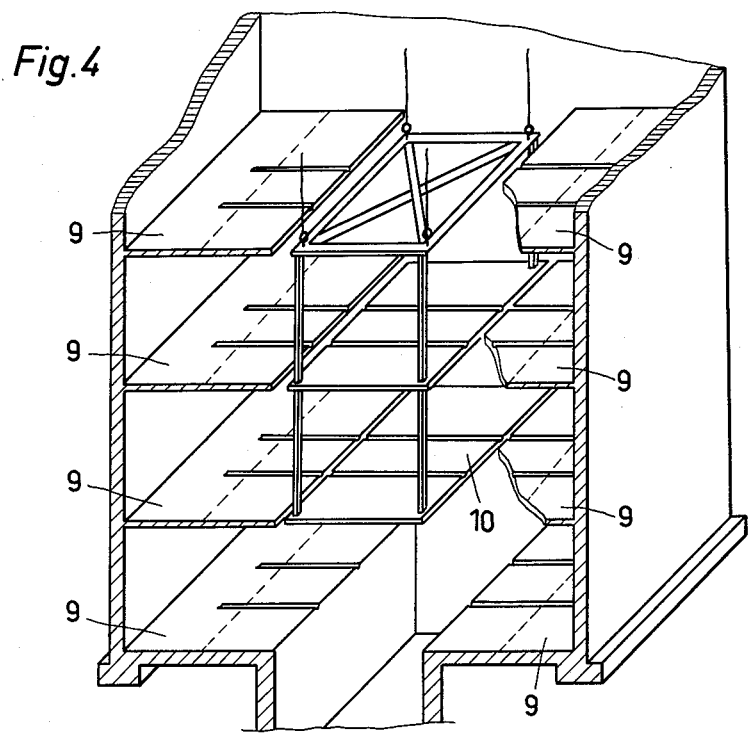
FIG. 4 is a perspective fragmentary view of a parking installation having the floor arrangements of FIG. 3.

FIG. 4 is a perspective view of a modified embodiment. The elevator platform 1 has been replaced by a two-story elevator cage having two platforms 10, one above the other, and spaced by the level difference of two adjacent stories of the building.

Figure 5:
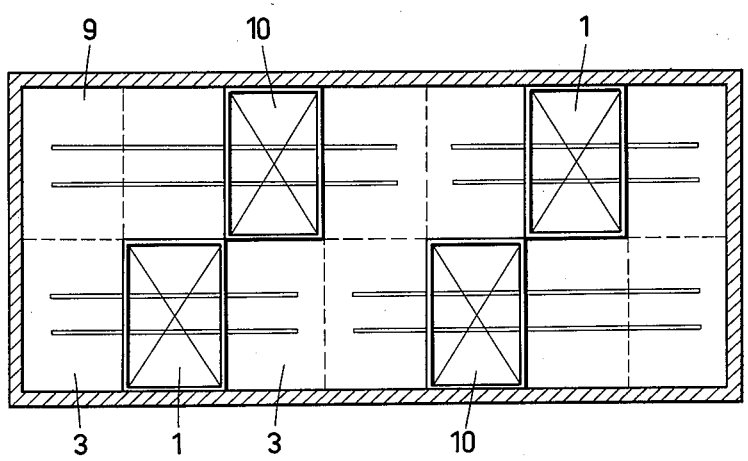
FIG. 5 shows one of many combinations feasible for a plurality of elevators and parking stalls in accordance with FIGS. 2 through 4.

FIG. 5 shows an embodiment of the invention in which individual floor units analogous to those of FIGS. 2 and 3, are combined into a larger installation. The compact compound of elevators and parking stalls, and the plain building walls demonstrate that the use of the cross carriage prevents any wasting of space.

Figure 6:
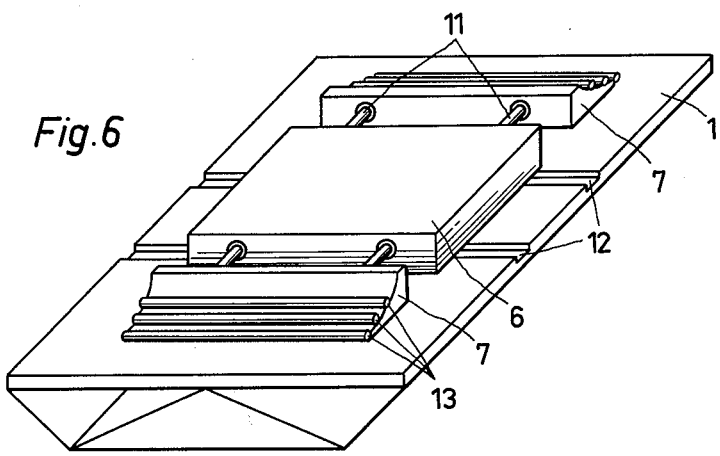
FIG. 6 is a perspective view of a transfer carriage having retractable vehicle-supporting jaws movable in the direction of movement of the supported vehicle.

FIG. 6 is a perspective view of a cross carriage 6, and shows two supporting jaws 7 protruding from end faces of the carriage. These jaws may be retracted and extended by telescopic means 11. The jaws 7 are wedge-shaped, the wedging top face of the jaw concave being defined by rollers 13 which come into contact with the vehicle wheels when the jaws are extended. The cross carriage has small wheels, not shown, on which the carriage can be moved along rail-like grooves 12 in the elevator platform 1. The grooves 12 are alignable with similar grooves in each parking stall.

Figure 7:
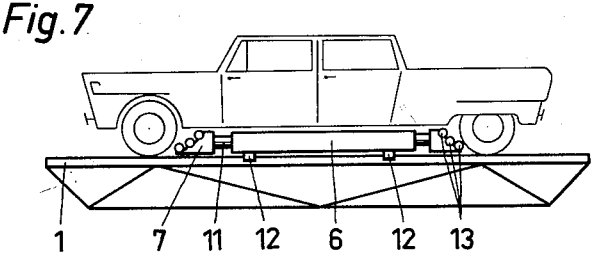
FIG. 7 shows the transfer carriage of FIG. 6 positioned under the vehicle with its jaws retracted, the view being in side elevation.
Figure 8:
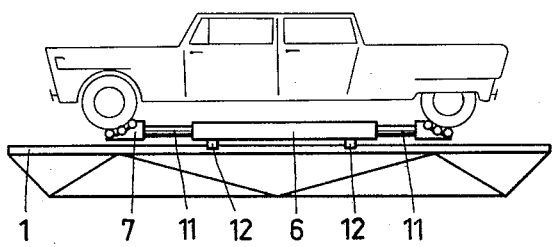
FIG. 8 is a view of the transfer carriage and the vehicle of FIG. 7, the jaws of the carriage being extended to lift the vehicle by its wheels.

A vehicle to be parked is driven through the entrance 4 onto the elevator platform 1 where it is longitudinally centered. The centering of the vehicle may be indicated, for instance, by an optical signal. While the vehicle is being driven onto the platform, the cross carriage is stationed in a parking stall beside the elevator platform; this parking stall is preferably kept free for this purpose at all times. When the vehicle has stopped on the elevator platform, the cross carriage 6 with its jaws 7 retracted is pushed from the side under the vehicle until it is transversely centered on the elevator platform. In this position, the supporting jaws 7 are extended by known means towards the front and rear wheels of the vehicle as indicated in FIG. 7. After the jaws have come into contact with the vehicle wheels, they are extended a little more so that the rollers 13 of the jaws lift the vehicle by its wheels as shown in FIG. 8, regardless of whether the wheels are blocked or not. By this procedure, the vehicle is mechanically clamped to the cross carriage and simultaneously lifted from the elevator platform by, say, one or two inches. Now the elevator platform together with the cross carriage and the vehicle may be moved to a free parking stall at any level. The cross-carriage mounted vehicle is shifted sidewise from the platform onto one of the parking stalls 9 in FIG. 4. Here the vehicle is lowered by retracting the jaws 7. The cross carriage 6 may then be driven back to the elevator platform 1 that is now ready to issue a vehicle or to receive another one on the ground floor.

The embodiment of FIG. 5 is preferred when it is desired to utilize the available space to best advantage, or to use one elevator for as many parking stalls as possible. Two parking spaces are arranged on one side or on each side of the elevator shaft on each story. The space at the far end from the elevator may be used for parking a vehicle for a longer period of time. To permit fast access to such vehicles on far spaces even when a vehicle is parked on the space next to the elevator shaft, two elevator platforms may be combined to form a two-story cage 10 as shown in FIG. 4. The vehicle on the nearest space, barring access to the far space, can be hauled by a cross carriage onto one of the two platforms of the cage; the cage can then be lowered or lifted by the height of one story, and the vehicle from the far space may be hauled in by another cross carriage.

The motion of the cross carriage to and from the elevator platform is accomplished by known means which need not be described here.

FIG. 9 shows the floor plan of another embodiment of the invention forming a unit, and FIG. 11 shows a series of such units making up a complete installation. The floor plan of FIG. 11 is thus only an amplification of the floor plan of FIG. 9 that will be described now. Two approach aisles 14 are provided along the two long sides of the horizontally elongated elevator shaft 15. The short sides 16 of the shaft are closed by the walls 17 one of which carries an operator's stand 18 outside the shaft 15. A two-platform cage 19 is provided for vertical motion in the elevator shaft. Each platform is equipped with the cross carriages or slides 6 above described.

The actual length of cage 19 need not correspond to the overall length of the shaft, since in the embodiments of the invention illustrated in FIGS. 9 to 14, the vehicles do not enter the cage from the short sides of the shaft. The platforms of the cage 19 are supported on beams 20. Such an arrangement, when used in connection with the cross-carriage illustrated in FIGS. 1 through 8, has the advantage of permitting four and even more vehicles to be placed next to the suitably extended long sides of the elevator shaft prior to moving them into or out of the cage. In other words, as soon as those four or more vehicles have been received by the elevator cage, further vehicles may be placed next to the long sides of the shaft, the exact number of vehicles depending upon the capacity of the elevator cage. Thus, the cage may be dimensioned in such a manner as to permit three vehicles to be received in tandem. Hence, in the case of a two-platform cage six vehicles can be received. This is particularly advantageous where a parking house incorporating the parking system of this invention has to handle rush-hour traffic when most vehicles are received at one time and issued at another time.

To speed up parking, it is also important that the vehicle be received by the cross-carriage in the entrance as quickly as possible without complex and time-consuming adjusting operations. This object and the object of safe parking are attained by the present invention.

Due to the fact that a plurality of vehicles may be stationed next to the long sides of the elevator shaft prior to being received by the cage, and since the cage is preferably designed as two-platform cage so that all waiting vehicles may be loaded in one operation, the elevator cage according to the invention has a large capacity. While a cross-carriage receives a vehicle, the latter is automatically centered with respect to the cross-carriage, thus saving considerable time. For the sake of safety, the rear wheels or all wheels of the vehicle may be blocked during this operation.

The approach aisles 14 are provided with freely movable floor sections 21, the purpose of which will be described further below. The movable floor sections 21 may be endless belts or slides freely movable from a normal position in the direction of the arrows 22, that is, in the direction in which a vehicle enters the parking installation. FIG. 10 shows an embodiment having two approach aisles each capable of receiving three vehicles in tandem.

In that embodiment, the elevator cage has a greater capacity, and requires a corresponding number of cross-carriages (not shown).

FIG. 11 shows a plurality of shaft units described in connection with FIG. 9, the shaft units being arranged side by side to constitute a parking installation according to the invention. The units at the lateral ends of the installation are provided with twin parking stalls 23 for long-time parking or similar purposes.

The arrangement of the approach aisles 14 next to the elevator shaft 15, as shown in FIG. 9, has the advantage that as many as four vehicles may be deposited simultaneously for later parking.

If a two-platform elevator cage is used, the four vehicles are loaded into the cage quickly one after another, and moved upwards or downwards, as the case may be, whereupon they may be simultaneously shifted to their parking stalls if suitably located free space is available.

In a period in which cars are both received and issued which usually occurs some time during the day, it is possible to reserve one side of approach aisle 14 for vehicles entering the parking installation and the other aisle for vehicles leaving the parking house in the direction indicated in FIG. 9 by arrows 24.

Figure 12:
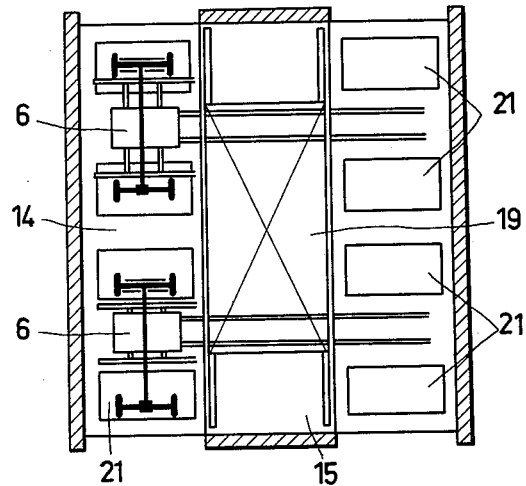
FIG. 12 illustrates the operation of the transfer carriage in the parking arrangement of FIG. 9.

The rail-like grooves 12 prevent the cross-carriage 6 from moving in a direction other than along its rails. It is, therefore, necessary to center the vehicle with respect to the cross-carriage. This is accomplished as follows:

As is indicated in the lower portion of FIG. 12, every incoming vehicle is stopped in such manner that the cross-carriage 6 together with its telescopic wheel-supporting jaws 7 may be moved underneath the vehicle behind the front wheels, with the wheel-supporting jaws retracted, while at least the rear wheels of the vehicle are braked and positioned on a movable floor section 21 at a larger distance from the cross-carriage than the front wheels. The vehicle is loaded on the carriage 6 by merely extending the supporting jaws 7 in the direction towards the front and rear wheels of the vehicle whereby the rollers 13 of the jaws engage the wheels and lift the vehicle, as has been described above. This is accomplished without the aid of any additional lifting means, the lifting effect being attained solely by the wedge action of the jaws. The vehicle is simultaneously centered with respect to the cross-carriage because the front supporting jaws of the carriage first engage the front wheels of the vehicle, as the jaws are extended, and before the rear jaws come into contact with the rear wheels. Upon further extension of the jaws, the vehicle is pushed forward by the front jaws until it is centered with respect to the cross-carriage as shown in the top portion of FIG. 12, in which the rear jaws engage the rear wheels. When the jaws are further extended, the vehicle is lifted by its wheels.

Figure 13:
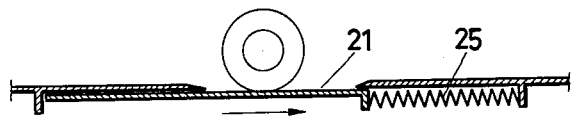
FIG. 13 is a fragmentary sectional view in elevation through a movable floor area of the parking arrangement of FIGS. 9 to 12.

The rollers 13 on the jaws 7 permit a vehicle to be loaded on the carriage 6 even when all its wheels are blocked. To this end, those surface sections 21 of the approach 14 on which the wheels of the vehicle are positioned are movable and may consist of sliding plates urged toward a normal position by springs 25, as shown in FIG. 13, or of endless belts. Thus, it is possible to center a vehicle, even when all its wheels are blocked or braked.

Figure 14:
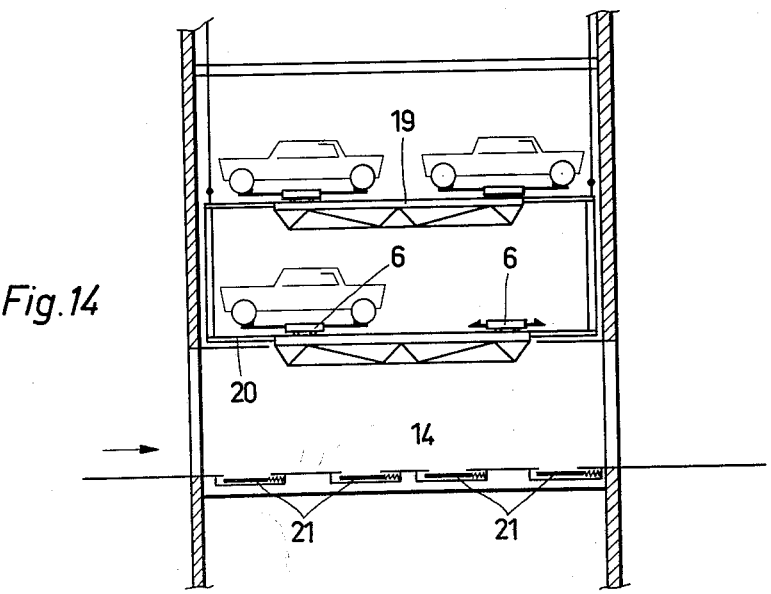
FIG. 14 shows an elevational section through the garage building of FIGS. 9 and 12, having a two-story elevator cage.

In FIG. 14 the parking installation according to the invention is shown an elevation for better illustration of two-platform elevator cage 19 having four cross-carriages 6.

FIG. 15 shows a detail of the approach aisle 14 illustrated in FIG. 9 in elevational section in a median plane parallel to the directions 22, 24. The movable floor section 21 consists of a belt 26 trained over two idler rollers 27, 28 immediately under the fixed floor 29 of the aisle to support a car wheel 8.

It will thus be apparent that the parking system of this invention greatly reduces manoeuvering of the vehicles without lifting motions of the cross-carriage, thus dispensing with the controls necessary therefor. Moreover, this system fully utilizes the parking space even though the vehicles are shifted sidewise. No complicated and tedious manoeuvering is necessary.

Since, according to the particular construction of the approach aisles in the arrangements shown in FIGS. 9 to 14, the elevator cage is not loaded from the short sides but from the long sides, an operator's stand may be arranged adjacent a short side of the cage, thus enabling the operator to overlook the entire shaft. Moreover, the elevator cage need not fill the entire cross-sectional area of the shaft. It may be at least one-fourth shorter, as the vehicles are shifted onto the platform sidewise rather than lengthwise.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A parking installation for a vehicle having front wheel means and rear wheel means, said installation comprising, in combination:
   (a) building means defining an approach aisle for movement of said vehicle in a predetermined direction and stall means on a level vertically spaced from said aisle,
       (1) said building means including a floor in said aisle for movement thereon of said vehicle and
       (2) a section of said floor being movable in said predetermined direction;
   (b) an elevator vertically movable in said building means between said level and a loading position horizontally adjacent said aisle;
   (c) a transfer carriage insertable under said vehicle between the front and rear wheel means thereof;
   (d) guide means for guiding movement of said transfer carriage transversely of said predetermined direction between said elevator in the loading position thereof and a portion of said floor adjacent said section, said portion and said section being spaced from each other in said predetermined direction, and for preventing movement of said transfer carriage in said predetermined direction when said carriage is on said floor portion; and
   (e) two claw means mounted on said carriage for simultaneous respective movement in opposite directions parallel to said predetermined direction for engagement with said wheel means when said vehecle is positioned over said floor portion and one of said wheel means stands on said freely movable floor section,
       (1) said claw means each having wedging top face means for lifting an engaged wheel means from said floor during movement of the claw means away from said carriage.

2. An installation as set forth in claim 1, further comprising a plurality of rotatable rollers on each of said claw means, said rollers jointly constituting said top face means.

3. An installation as set forth in claim 2, wherein each of said rollers is rotatable about an axis perpendicular to said predetermined direction.

4. An installation as set forth in claim 1, wherein said floor section includes a plate member freely movable in said predetermined direction and yieldably resilient means urging said plate member to move toward a normal position thereof.

5. An installation as set forth in claim 1, further comprising freely movable endless belt means, a portion of said belt means constituting said floor section.

References Cited in the file of this patent

UNITED STATES PATENTS

| | | |
|---|---|---|
| 1,584,080 | Dinkelberg | May 11, 1926 |
| 2,229,776 | Steinhorn | Jan. 28, 1941 |
| 2,691,448 | Lontz | Oct. 12, 1954 |
| 2,712,875 | Leopold | July 12, 1955 |
| 2,818,186 | Sinclair | Dec. 31, 1957 |

FOREIGN PATENTS

| | | |
|---|---|---|
| 1,052,021 | France | Jan. 20, 1954 |